July 6, 1965 M. YAKOVLJEVIC 3,193,182

MAILING DEVICES

Filed March 20, 1963

INVENTOR.
Milenko Yakovljevic
BY Joseph B Forman

United States Patent Office 3,193,182
Patented July 6, 1965

1

3,193,182
MAILING DEVICES
Milenko Yakovljevic, 153—36 73rd Ave., Flushing, N.Y.
Filed Mar. 20, 1963, Ser. No. 266,692
2 Claims. (Cl. 229—92.8)

This invention relates to improvements in mailing devices and more particularly to mailing devices such as postcards or the like which are provided with photographic information in addition to having the usual space for a message and address.

It is an object of my invention to provide a new and improved mailing device such as a postcard which is formed with detachable portions, which upon proper detachment form slides such as may be projected by any well known slide projector.

It is a further object of my invention to provide a new and useful mailing device such as a postcard wherein a portion of the card when detached from the whole continues to provide utility after the card has been used for its original intended purpose.

Other objects and advantages of my invention will be obvious from a reading of the specification when considered with the drawings, wherein.

Figure 1:
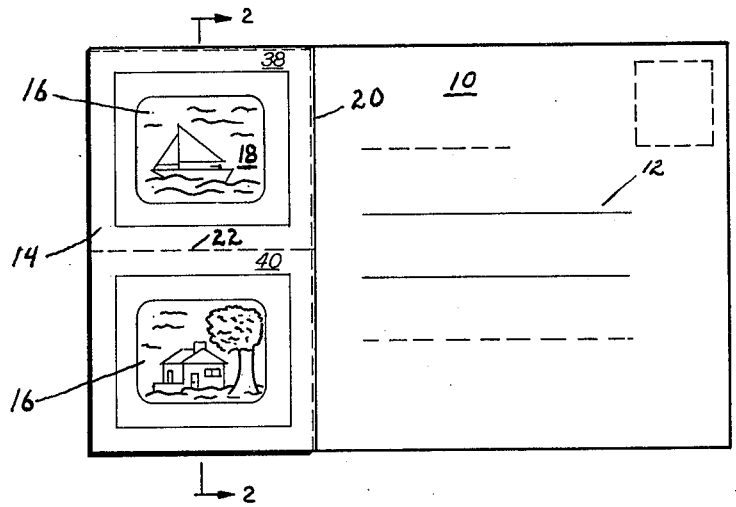
FIGURE 1 is a plan view of a mailing device embodying my invention.
Figure 2:
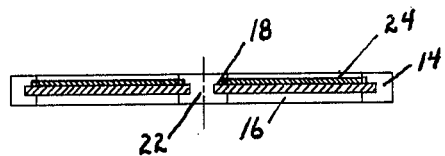
FIGURE 2 is a sectional view along line 2—2 of FIGURE 1.

The invention comprises a postcard including a base member 10 having an addressee portion 12 and a slide forming portion 14. The back of the addressee portion 12 may be left blank for a written message or may have a preprinted message thereon.

The slide forming portion 14 is provided with suitable apertures or cutouts 16 through which may be viewed a photograph transparency 18. The transparency 18 may be in black and white, or color, and is stationarily fixed with respect to its respective aperture 16.

As may readily be seen from the drawing, addressee portion 12 and slide forming portion 14 of postcard 10 are defined by means of a line perforation, fold or indentation 20 to permit ready fracture of the two portions 12 and 14. A like line perforation, fold or indentation 22 is provided in a plane substantially perpendicular to that in which the line perforation, fold or indentation 20 extends, so that if more than one slide is provided, relatively easy fracture of the various slides may be accomplished. It should, however, be borne in mind that such fracture should require the application of an external force which would be greater than may be expected in the handling of the postcard 10 or the like in transit.

Since there is possibility of damage to the emulsion side of a negative during transit through the mails, my improved mailing device is provided with a suitable transparent member 24 which extends across and beyond the borders of apertures or cutouts 16. Transparent member 24 should be of any known material which is of sufficient hardness to prevent scuffing of the emulsion side of the photographic transparency 18, which faces and is in contact with transparent member 24 after the postcard embodying my invention has been fabricated.

Figure 3:
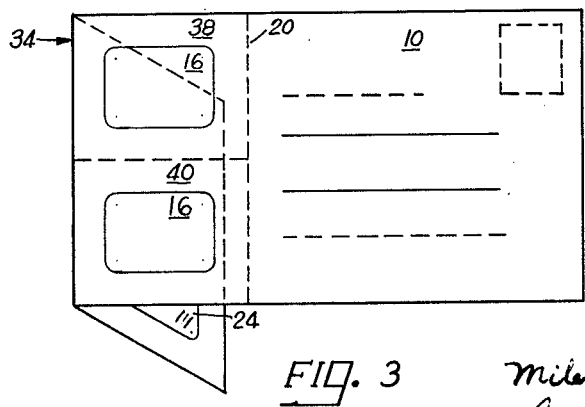
FIGURE 3 is a plan view partially in projection intended to show how an illustrative device embodying the invention may be formed.

A method for forming a postcard embodying my invention will now be described with particular reference to FIGURE 3. A postcard embodying my invention may

2 be formed of a unitary piece of stock 10 provided with four apertures 16. The four apertures are so formed as to permit cooperating apertures respectively to mate when the stock 10 is folded back against itself along an illustrative line 34. The apertures which are folded back against the stock 10 are overlaid with a transparent member 24. Alternatively the transparent member 24 may be placed across their apertures of the counterparts. A transparency such as 18 of FIGURE 1 is then positioned against transparent member 24 with the emulsion side in contact with transparent member 24. The folded back portion is then suitably cemented to the main body of the unitary piece of stock 10. The segments 38 and 20 of the card are then defined by means of perforations, a fold or indentation along lines 42a and 22.

Having thus described my invention, I desire it understood that variations thereof will be obvious to others and detail changes may be made in the construction and use of my improved mailing device without departing from the spirit or scope of my invention.

What is claimed is:

1. A mailing device comprising a base member having a first portion and a second portion, first fracturable means defining said first and second portions and extending substantially from one border to a diametrically opposite border of said base member, said first portion of said base member including a plurality of apertures, an overlaying member having a corresponding plurality of apertures secured to said first portion with corresponding apertures in face to face alignment, a photographic transparency, including an emulsion side, extending across and beyond each aperture and positioned between said first portion and said overlaying member, and second fracturable means extending in a plane substantially perpendicular to said first fracturable means substantially across said first portion and said overlaying member, and between adjacent ones of said defined apertures.

2. A mailing device comprising a base member having a first portion and a second portion, first fracturable means defining said first and second portions and extending substantially from one border to a diametrically opposite border of said base member, said first portion including a portion of said base member folded back upon itself, a plurality of apertures in said base member and a plurality of corresponding apertures in said folded back portion of said base member, respective ones of said apertures in said base member and said folded back portion being superposed in face to face alignment to form respective common apertures, a photographic transparency, including an emulsion side, extending across and beyond the borders of each of said apertures and between said base member and said folded back portion, a transparent member overlaying the emulsion side of each said photograph transparency, means securing said first portion to said folded back portion and second fracturable means extending in a plane substantially perpendicular to said first fracturable means and between adjacent ones of said defined apertures.

References Cited by the Examiner
UNITED STATES PATENTS 1,918,384  7/33   Falvey _____ 229—92.1
2,256,399  9/41   MacHarg.
2,291,173  7/42   Simpson.
2,720,833  10/55  Lindon.

FRANKLIN T. GARRETT, Primary Examiner.